(12) United States Patent
Willemsen et al.

(10) Patent No.: US 8,029,144 B2
(45) Date of Patent: Oct. 4, 2011

(54) COLOR MIXING ROD INTEGRATOR IN A LASER-BASED PROJECTOR

(75) Inventors: Oscar Hendrikus Willemsen, Den Bosch (NL); Marcellinus Petrus Carolus Michael Krijn, Eindhoven (NL)

(73) Assignee: Koninklijke Philips Electronics N.V. (NL)

( * ) Notice: Subject to any disclaimer, the term of this patent is extended or adjusted under 35 U.S.C. 154(b) by 560 days.

(21) Appl. No.: 12/097,291

(22) PCT Filed: Dec. 13, 2006

(86) PCT No.: PCT/IB2006/054823
§ 371 (c)(1),
(2), (4) Date: Jun. 13, 2008

(87) PCT Pub. No.: WO2007/072336
PCT Pub. Date: Jun. 28, 2007

(65) Prior Publication Data
US 2008/0278691 A1 Nov. 13, 2008

Related U.S. Application Data

(60) Provisional application No. 60/752,084, filed on Dec. 20, 2005, provisional application No. 60/867,872, filed on Nov. 30, 2006.

(51) Int. Cl.
*G03B 21/28* (2006.01)
(52) U.S. Cl. ............ 353/31; 353/122; 362/551; 362/553
(58) Field of Classification Search .................... 353/31, 353/94, 122; 362/551, 553, 561, 582; 385/34, 385/116, 133, 147
See application file for complete search history.

(56) References Cited

U.S. PATENT DOCUMENTS

| 6,939,009 | B2 * | 9/2005 | Fischer et al. | 353/43 |
| 7,077,525 | B2 * | 7/2006 | Fischer et al. | 353/43 |
| 7,298,940 | B2 * | 11/2007 | Abu-Ageel | 385/31 |
| 7,379,651 | B2 * | 5/2008 | Abu-Ageel | 385/146 |
| 7,719,738 | B2 * | 5/2010 | Abu-Ageel | 359/201.2 |
| 2005/0007767 | A1 * | 1/2005 | Fischer et al. | 362/157 |
| 2005/0162853 | A1 | 7/2005 | Jain | |
| 2005/0225866 | A1 | 10/2005 | Abu-Ageel | |
| 2006/0012842 | A1 * | 1/2006 | Abu-Ageel | 359/196 |
| 2008/0079904 | A1 * | 4/2008 | Bartlett | 353/31 |

FOREIGN PATENT DOCUMENTS

| EP | 1496709 A1 | 1/2005 |
| EP | 1498773 A1 | 1/2005 |

OTHER PUBLICATIONS

D.S. Dewald, S.M. Penn, M. Davies, Sequential color recapture and dynamic filtering: A method of scrolling color, SID 01 Digest, 1076.
A.J.S.M. de Vaan. Ultra compact LCD projection system, Disclosure CDS-01-03-09.
A.J.S.M. de Vaan and W.H. Smits. 3 prism illumination system for transmissive LCD projection systems, Disclosure CDS-01-03-12.
M.J. Zwanenburg, Light recycling for LCoS projection TV. PRUSA-TN2002-016.

* cited by examiner

*Primary Examiner* — Georgia Epps
*Assistant Examiner* — Bao-Luan Le

(57) ABSTRACT

A system for providing illumination includes a color mixing rod integrator for receiving and homogenizing laser light or output to a spatial light modulator. The rod integrator recombines the light of the primary colors, thus obviating dichroic recombination optics. Entrance and exit faces of the integrator have reflective layers where the length of the integrator is decreased and/or the f-number in the system is increased.

20 Claims, 3 Drawing Sheets

COLOR MIXING ROD INTEGRATOR IN A LASER-BASED PROJECTOR

CROSS REFERENCE TO RELATED APPLICATIONS

This application claims the benefit of International Application Number PCT/IB2006/054823, filed Dec. 13, 2006, and U.S. Provisional Applications Ser. Nos. 60/867,872, filed Nov. 30, 2006, and 60/752,084, filed Dec. 20, 2005, which are incorporated herein in whole by reference.

The present invention relates to a color mixing rod integrator for illuminating a display panel in laser-based projection engines. More particularly, the present invention is related to a color mixing rod integrator that reduces laser speckle and at the same time ensures homogeneous illumination of projected images in laser-based projection engines.

At present the Ultra High Pressure (UHP) lamp is the most established light source for rear and front projection applications, since it combines high lumen efficacy with high source brightness at affordable cost. In the last few years solid-state light source technology has improved so much that it is expected to compete with UHP technology. This is because solid-state light sources offer some unique advantages such as high color purity, fast optical response and mercury free operation. The most mature solid-state light source technology applicable for displays is the high brightness LED that is available in all display primaries at low cost, with high lumen efficacy and with a small form factor. However, since the light output of an LED is rather low and since the &endue is comparable to that of a UHP lamp, a projector based on LEDs has low lumen output and moderate size. Hence, such projectors cannot (yet) compete with UHP lamps on applications that require large screen size. However, they can very well be used in new application areas such as handheld and mobile projection that require low operating power and a compact design. However, it remains unclear whether LED based projectors can keep up with the ever-increasing demands of smaller size and higher lumen output.

Another type of solid-state light source, a laser, has extremely high source brightness combined with a very small étendue. In fact, it can be considered to be a point source and this enables one to construct the smallest light engine possible. It enables the design and implementation of a truly portable battery operated miniature projection display for handheld and mobile applications. In addition, lasers are available in output powers that can range several Watts, thus enabling high lumen output. Keeping the above in mind, it is expected that lasers become the ultimate light source for all types of projection applications.

However, there are some issues that impede the application of lasers in displays. The most important of these issues are laser speckle, cost, availability in green and blue and lumen efficacy. The speckle issue is quite severe. Although the availability and lumen efficacy will probably be solved in the foreseeable future, lasers for displays will then be at the starting point of their learning curve, implying that the cost per lumen, coming out of a laser will still be quite high. Hence, it will be very difficult to compete with the established UHP technology in applications such as business to business front projection and rear projection TV. Instead, it is much more sensible to aim at new portable projection applications.

For these types of applications LEDs and lasers are both attractive options and they will probably compete with each other mainly on the price and size of the projector. As mentioned before, the size of a laser-based projector will be much smaller than that of an LED-based projector, but the price per lumen produced by a laser will be an order of magnitude higher in the near future. In addition, even when both technologies have reached their full maturity, lasers will still be more expensive, because the process flow for lasers requires more deposition steps that each have to be done with a higher level of process control.

Nevertheless, the higher price per lumen does not need to be a killing bottleneck for the application of lasers in projection displays since there are many opportunities to lower the cost of the complete light engine of the projector. Firstly, projectors using lasers will be more light-efficient, implying that the required lumen output from the laser is reduced. Secondly, using an architecture with a two-dimensional scanning mirror obviates the need for an expensive light modulator, such as an LCoS panel. However, it is questionable whether this type of engine can provide the needed image quality. It is also an option to lower the cost of a more or less conventional projector based on a two-dimensional light modulator.

More recently, optical architectures using light guides have also been proposed for HTPS transmissive- and DMD and LCoS-based reflective projection engines. These proposed architectures have in common that they have to be combined with a light source emitting white light.

This implies that the light has to be split into three or more primary colors and this function can be obtained by covering the exit face of an integrator with three types of dichroic filters. Another implication of a white light source is that color sequential operation is not possible without using moving parts. Hence, these architectures are more suited to 3-panel architectures, which intrinsically are more expensive and less compact than 1-panel architectures.

When light sources emitting light of the display primary colors are used, such as LEDs or lasers, it is possible to use frame sequential operation on a single display panel. In such an architecture only a single light guide is required for homogenization of all three colors.

The present invention provides an optical system, component and method that exploit the high beam quality of a laser light source to lower the cost and decrease the size of a frame sequentially operated and laser-based projector. Using a color mixing rod integrator, the present invention homogenizes laser light, thus supplying the proper illumination pattern to a spatial light modulator. The color mixing rod integrator is also used to recombine the light of at least two primary colors, thus obviating the need for dichroic recombination optics. For this purpose all light is coupled into the entrance face 101 of one and the same integrator, see FIG. 1.

FIG. 1*a* illustrates a color mixing rod integrator that is illuminated with three laser sources, according to a first embodiment of the present invention;

FIG. 1*b* illustrates the use of a color mixing rod integrator in a light engine of a projector by proximity illumination;

FIG. 1*c* illustrates the use of a color mixing rod integrator in a light engine of a projector by applying relay optics;

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and structure may be omitted from the current descriptions so as not to obscure the present invention.

The present invention provides a system, apparatus and method wherein a light-guide is combined with at least two and most commonly three types of laser sources that have high beam quality and emit light in the wavelength of the display primaries. The light beams are focused at the entrance holes by means of optical elements, for instance positive lenses, such that they diverge in the integrator (see FIG. 1). In the light-guide most of the rays will hit the walls of the guide, at which they are reflected by means of total internal reflection (TIR). This mechanism ensures that the light distribution at the exit face of the light-guide is uniform and can be used to illuminate a display panel.

Figure 1A:
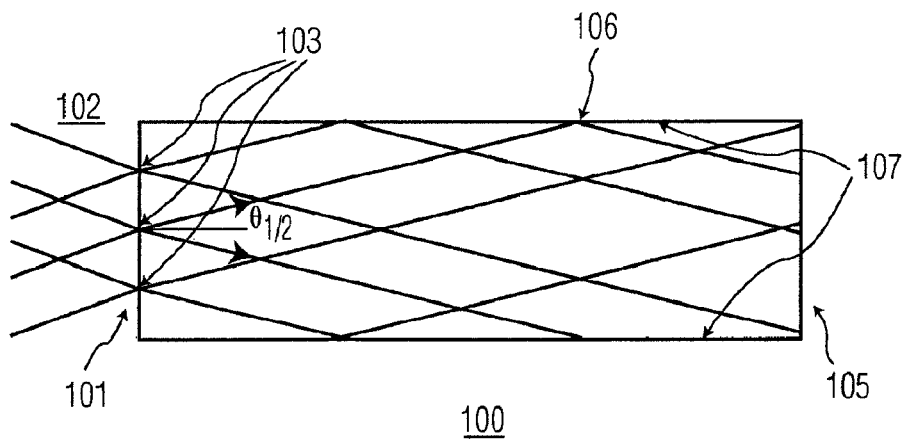

Please note that in FIG. 1a the distance between the beams when entering the integrator is quite large. In a preferred embodiment the distance is as small as possible to avoid a mismatch between the intensity distribution of red, green and blue. Also note that the direction of the beams is preferably perpendicular to the entrance face 101 of the color mixing rod integrator 100. Further, one or more beams at a same angle or beams at a slightly different angle are possible to enable the beams to be focused into the same hole. Although this results in a correct image, colored shadows can occur when the light is blocked beyond the focus.

Figure 1B:
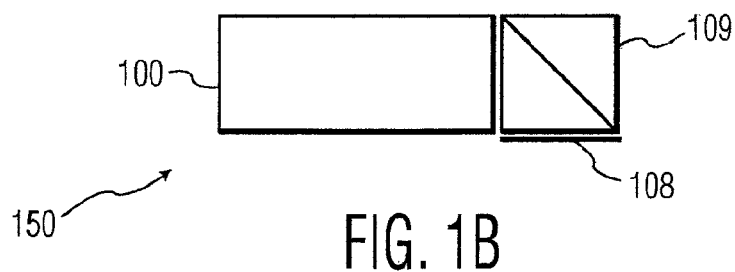
Figure 1C:
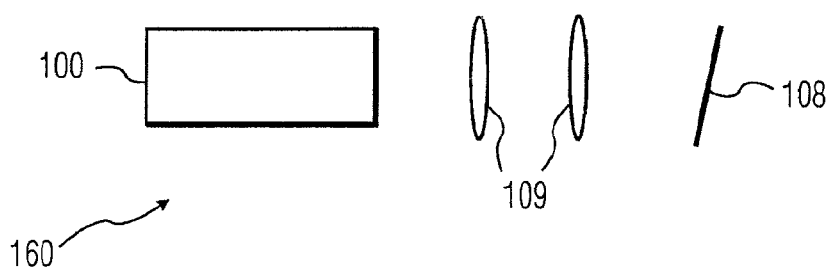

Preferred embodiments illuminate the panel in the two alternative ways illustrated in FIGS. 1b and c. In a first alternative 150, the color mixing rod integrator 100 is used for proximity illumination of a display panel 108. Since all the light is combined in a single integrator, this illumination system has to be combined with a color-sequentially operated display panel, such as an LCOS panel or a Digital Mirror Device (DMD) 108. In FIG. 1b the first alternative 150 is illustrated, namely, that of illuminating an LCOS panel 108. A second alternative 160, as illustrated in FIG. 1c, uses the color mixing rod integrator 100 of the present invention for illumination by means of relay optics 109. Note further that the second alternative 160 is more bulky than the first.

Figure 2:
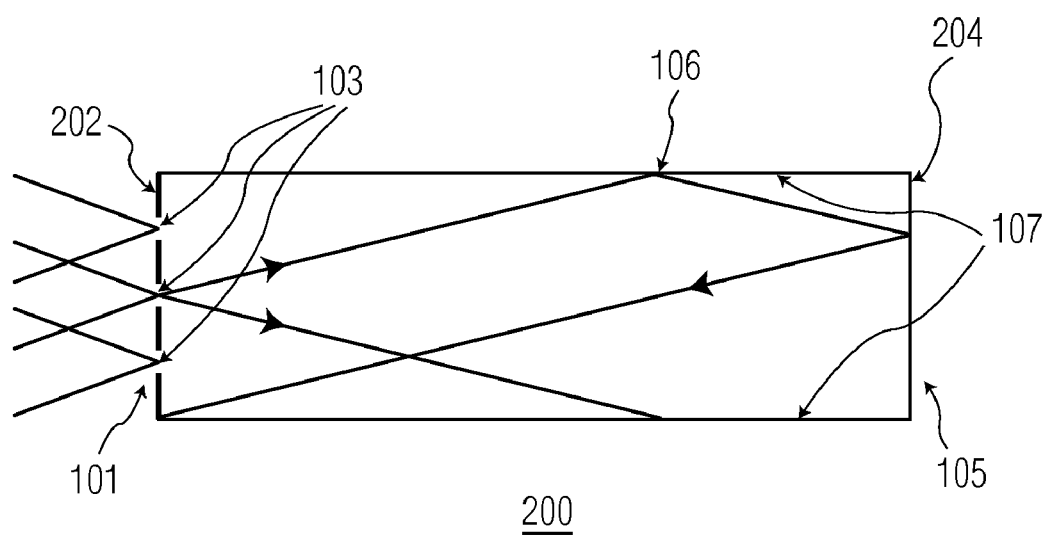
FIG. 2 illustrates a first alternative embodiment of a color mixing rod integrator component, according to the present invention.

For a mobile or handheld projector, it is essential to have a small device. However, in order to have sufficient homogenization in the light guide, the majority of the light beams must have at least two reflections at the side walls thereof. In the present invention the number of reflections in the color mixing rod integrator can be increased by increasing the divergence angle θ, which is equivalent to using a beam with a lower f-number. However, the divergence angle can only be increased to a level that is still acceptable to the projection lens of the system. In practice, the projection lens typically has an f-number of 2 in air (which implies an f-number of 3 in the light integrator when it has an index of refraction of 1.5, being typical for glass or plastic). When using the rule of thumb that the ratio of length and width of the integrator must be equal to twice the f-number in order to obtain sufficient homogenization of the light distribution, the result is an integrator length of 70 mm. Since this is rather large for a mobile projector, an alternative design for the integrator is provided in the second embodiment and is illustrated in FIG. 2.

In a second embodiment 200, part of the laser light is also allowed to reflect back towards the laser light sources. To this end, the exit face 105 of the color mixing rod integrator is covered by a partially reflective coating 204 that is partially reflective at the wavelengths of the laser light sources such that light incident thereon is partially reflected back through the body 106 of the integrator towards the laser sources. In order to prevent loss of most of the light traveling back towards the sources, the entrance face 101 of the color mixing rod integrator 200 is covered with a highly reflective coating 202 (also shown in FIG. 1A as reference numeral 102), for instance silver or a multi-layered dielectric stack, to reflect light incident thereon back towards the exit face 105 of the color mixing rod integrator 200. The reflection coefficient of the highly reflective coating 202 on the entrance face 101 is preferably very high. In practice, a reflection coefficient of at least 98% is preferred. A plurality of holes 103 has preferably been made in the highly reflective coating 202 on the entrance face 101, each one of said plurality of holes 103 corresponding to at least one of said plurality of laser light sources. Although, one hole for all three colors is possible this decreases the throughput of the color mixing rod integrator 200 and is not preferred. Each hole of the plurality of holes 103 is of such a diameter that laser light, which has an extremely low étendue and thus can be focused to a very small spot, can pass through the hole without substantial light loss or diffraction effects.

By way of example only, in FIG. 1a a laser beam is drawn that is focused such that it enters a color mixing rod integrator 100 with a half angle $\theta_{1/2}$. A beam with such a half angle can be focused to a diameter d that is given by:

$$d = 1.22 \frac{\lambda}{2\tan(\theta_{1/2})} \quad (1)$$

The diameter of the hole preferably exceeds this size by at least a factor of two to minimize diffraction effects.

In the embodiment illustrated in FIG. 2, although a reflective coating 202 on the entrance face 101 reflects most of the light incident thereon back towards the exit face 105, some of the light will pass through the holes 103 or will be absorbed somewhere else in the system. A model is presented below of the color mixing rod integrator 200 to determine the influence of the loss factors on the total optical throughput of the integrator 200.

Figure 3:
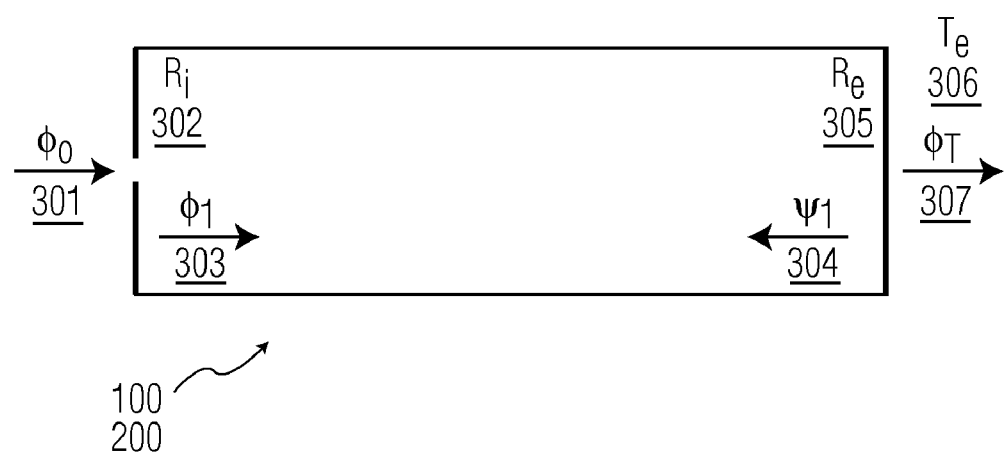
FIG. 3 illustrates a rod integrator component with the relevant light fluxes in the device, according to the present invention.

The light flux at different positions in the color mixing rod integrator 200 is indicated in FIG. 3. In FIG. 3 the following symbols are defined:

$\phi_0(r)$ 301 is the light flux that enters the integrator through an entrance hole 103 with relative area r (i.e. the fraction of the total area). Of course, the light flux is a function of the radius of the hole. Inside the integrator 100, 200 the light flux going from left to right is defined as $\Phi_1$ 303 and the light flux going from right to left as $\psi_1$ 304. Finally, the light flux leaving the integrator is defined as $\Phi_T$ 307.

The reflection coefficient of the side walls (interior surface of the integrator) 107 is defined as unity because of total internal reflection, the reflection of the entrance face as $R_i$ 302, the reflection of the exit face as $R_e$ 305 and the transmission of the exit face as $T_e$ 306.

The flux at different positions inside and outside the integrator can now be described in the following set of equations:

$$\phi_1 = \phi_0(r) + R_i(1-r)\psi_1 \quad \psi_1 = R_e\phi_1 \quad \phi_T = T_e\phi_1 \quad (2)$$

The transmitted intensity is calculated by eliminating $\phi_1$ and $\psi_i$:

$$\phi_T = \frac{T_e \phi_0}{1-(1-r)R_i R_e} \quad (3)$$

With this formula the transmission efficiency can be calculated, which is defined by $\phi_T/\phi_0$. The result of a calculation for a laser beam that illuminates a 0.55" WVGA HTPS transmissive LCD panel by proximity illumination is a follows:

The area of the exit face is approximately 8.4*11.2 mm$^2$.

The maximal F/# of the beam that is focused onto a hole 103 of the integrator is 5. Hence, the spot diameter of the (diffraction limited) beam is maximally 60 μm in that case, implying that the hole diameter should be 120 μm or larger.

The value of r is $3.10^{-4}$ (three holes for the colors).

The reflection coefficient of the entrance face is varied between 98 and 99%.

Figure 4:
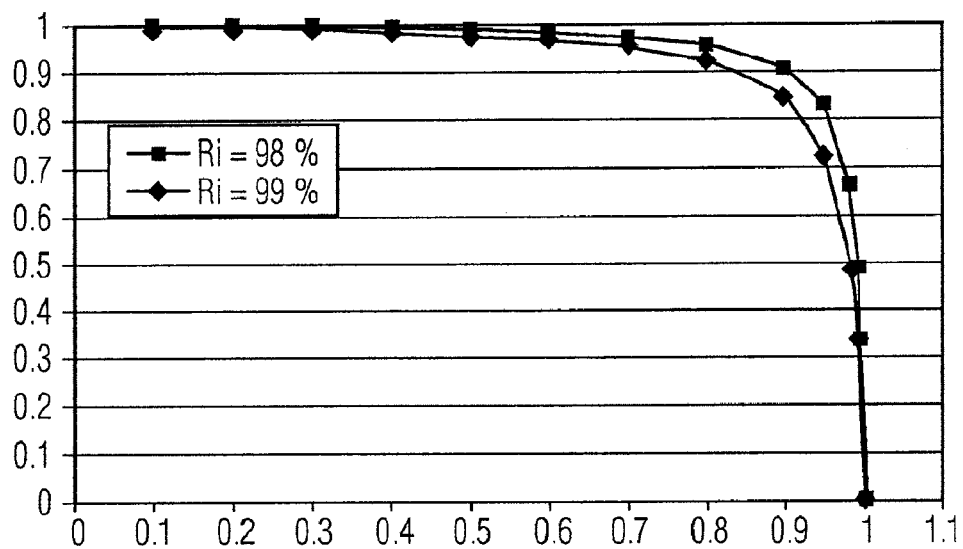
FIG. 4 illustrates a graph of the transmission of the color mixing rod integrator component 100, according to the present invention, as a function of the reflectivity of the exit face.

FIG. 4 illustrates a graph of the transmission of the color mixing rod integrator 200 as a function of the reflectivity of the exit face.

Figure 5A:
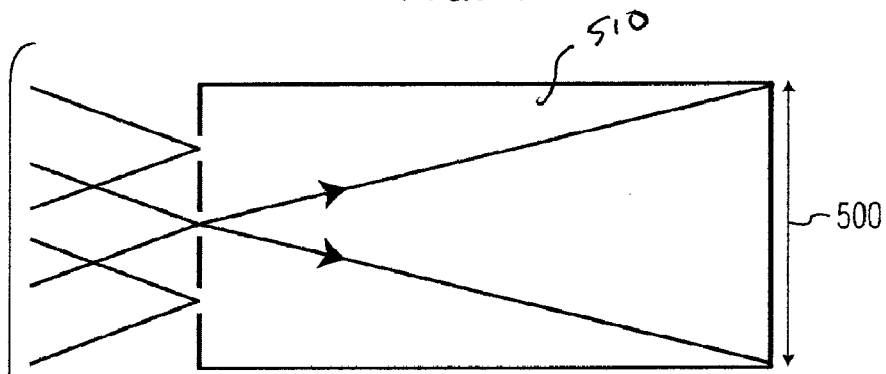
FIGS. 5*a* and *b* illustrate two alternative embodiments of the color mixing rod integrator in the present invention.

In the calculation, two alternatives can be distinguished for applying the color mixing rod integrator:

1. In the first alternative, the beam diverges inside the integrator 510 to such an extent that it fully covers the exit face 500 of the integrator in the first pass after the integrator. The situation in which it just covers the exit face is depicted in FIG. 5a. Also a longer integrator (or lower f-number) is possible. A compact integrator can be obtained by choosing a low f-number (for instance 2). From a simulation it has been determined that a reflection coefficient of 0.5 of the exit face and an integrator length of 35 mm results in a homogeneous pattern at the exit face. It can be seen from FIG. 4 that the transmission of the color mixing rod integrator 510 is almost unity in that case.

Figure 5B:
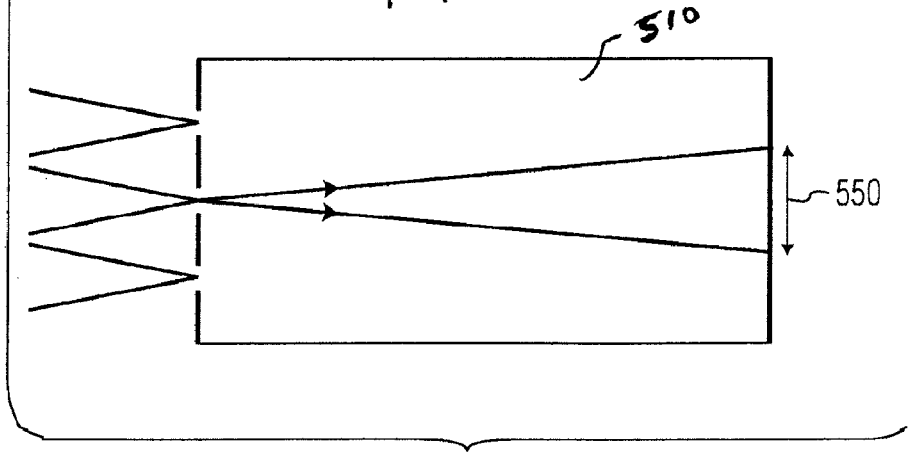

2. In the second alternative the f-number is chosen to be larger than that of the integrator 510 of the first alternative, so that the first pass through the color mixing rod integrator 510 results in a relatively small spot at the exit face. This situation is illustrated in FIG. 5b. If the reflection coefficient of the exit face is too small, the intensity distribution at the exit face shows a bright 'hot spot', which also appears in the projected image. Therefore, the reflection coefficient is preferably chosen sufficiently high but not too high. From simulation it has been determined that the reflection coefficient Re of the end face is preferably at least 95%, when combined with an f-number of 5 and a color mixing rod integrator length of 20 mm. In the situation where $R_e=95\%$, the throughput of the color mixing rod integrator is 72% and 83% for $R_1=98\%$ and 99%, respectively. The throughput at $R_e=95\%$ is mainly determined by the loss due to the reflection of the entrance face. Hence, it is advantageous to decrease r by, for instance, placing interference filters at the entrance holes 103 that only allow light of the correct wavelength to pass therethrough.

It should be noted that this second alternative for applying the color mixing rod integrator 200 of the present invention can include a projection lens with a higher f-number. This has the advantage that it decreases the cost and increases the depth of focus.

In both alternative embodiments of applying the color mixing rod integrator 200 of the present invention, the light will, on the average, pass through the color mixing rod integrator 200 a plurality of times. If the path length difference of beams passing through the integrator 200 a different number of times is larger than the coherence light of the light used, the beams do not interfere with one another. This results in a laser generated image by the illumination system having a decreased speckle contrast, when compared with a system that only uses a single pass through an integrator. It also holds that the average number of passes determines the amount of speckle reduction. Hence, the second alternative provides the best speckle reduction.

In the present invention:

The color mixing rod integrator comprises an optical integrator and color mixer that together with its light source can be used as an illumination unit in a projection engine. The color mixing integrator of the present invention can be used for proximity illumination and for illumination by means of relay lenses. It is also possible to enlarge or decrease the size of the exit face of an optical imaging system according to the present invention. In case of enlargement of the exit face, the f-number of the integrator can be made smaller, such that the f-number at the display panel is still typically 2.

The panel that is illuminated can be a two-dimensional or one-dimensional spatial light modulator. The former case is described in detail in the foregoing discussion of embodiments. In the latter case a planar light-guide with the shape of the embodiments described must be used in which the thickness of the light-guide is much smaller than the other dimensions of the light-guide.

The present invention can be used to illuminate very small display panels (below 0.5") without a loss of light due to a limited acceptance aperture of the system. Using a very small display panel lowers the panel cost and at the same time decreases the size of the illumination optics. This is an advantage of the present invention over UHP and LED based systems.

In all embodiments of the present invention discussed above, one color per laser is used. However, this was to simplify the discussion. It is possible for more lasers per color to be used, such that each color has its own hole in the entrance face. The use of more than one source per color adds to the cost, but at the same time, decreases the speckle contrast.

It should be noted that the illumination schemes, as depicted in FIG. 1b and 1c both have an additional advantage of increasing the optical efficiency of the system. The light of the pixels in the off-state can be redirected towards the rod integrator. Since the reflection coefficient of the exit and/or entrance face of the integrator is quite high, most of the light can be recycled. A quick calculation yields the result that the peak brightness at video display load increases by a factor of three. This results in sparkling images.

In order to decrease the effect of a hot spot in the image, the reflection coefficient of the exit face of the integrator need not be constant across the surface of the exit face.

The invention also applies to light engine architectures having more than three primary colors.

While the preferred embodiments of the color mixing rod integrator of the present invention have been illustrated and described, it will be understood by those skilled in the art that the embodiments of the present invention as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling within the scope of the claims appended hereto as well as all implementation techniques.

The invention claimed is:

1. A color mixing rod integrator for a plurality of beams of laser light of a plurality of primary display colors, comprising:
   a rod-shaped body having an interior that passes laser light therethrough and an interior surface that reflects light incident thereon;
   an entrance face covered with a first reflective coating to reflect light incident thereon back into the interior of the rod-shaped body and positioned on a first end of the rod-shaped body having a plurality of holes therein such that each hole of said plurality of holes allows light of at least one beam of said plurality of beams to pass therethrough into the interior of the rod-shaped body;
   an exit face positioned on a second end of the rod-shaped body opposite to and parallel to the entrance face, said exit face being configured to allow a part of light incident thereon to pass therethrough; and
   at least one lens for diverging each of said beams toward said exit face through said interior,
   wherein part of the laser light entering said color mixing rod integrator via said plurality of holes is forced to pass through the interior thereof several times before passing through said exit face and then exiting through said exit face as exit light, and wherein the exit light is homogenized by the color mixing rod integrator.

2. The color mixing rod integrator of claim 1, wherein said at least one lens includes at least one positive lens positioned at said plurality of holes such that divergence of a beam at end of a first pass through the color mixing rod integrator is a divergence selected from the group consisting of a spot across entirety of the exit face and a spot of a predetermined diameter on the exit face.

3. The color mixing rod integrator of claim 2, wherein:
   said exit face is covered with a partially reflective coating that allows a part of light incident thereon to pass therethrough and reflects a part of light incident thereon back into the rod-shaped body toward a source of said light; and
   said first reflective coating on said entrance face has a reflectivity which is higher that a reflectivity of the partially reflective coating.

4. The color mixing rod integrator of claim 3, wherein:
   the first reflective coating is selected from the group consisting of silver and a dielectric stack; and
   the plurality of holes each has a diameter that exceeds the diameter of the laser light that can be focused into a first hole of the plurality of holes by at least a factor of two.

5. The color mixing rod integrator of claim 4, wherein:
   said laser light is focused to enter each of the plurality of holes with a half angle $\theta_{1/2} < 20$ degrees in air;
   each of said plurality of holes has a diameter $\geq 2d$ where d is determined by the equation $$d = 1.22 \frac{\lambda}{2\tan(\theta_{1/2})};$$

to minimize diffraction effects; and
   said second reflective coating is dimensioned to have a transmission coefficient $T_e$ that is lower than 50% and a reflection coefficient $R_e = 1 - T_e$ such that part of the light is transmitted and part is reflected back into the color mixing rod integrator thereby,
   wherein the reflected light travels back to the entrance face and is reflected for another pass through the color mixing rod integrator with a net effect that light exiting the color mixing rod integrator at the exit face is composed of light that has passed through the color mixing rod integrator at least twice.

6. The color mixing rod integrator of claim 5, wherein said half angle $\theta_{1/2} < 15$ degrees in air.

7. A method for integrating a plurality of laser beams of light each beam comprising one of a plurality of primary display colors, the method comprising the acts of:
   providing a color mixing rod integrator having a rod-shaped body that includes an entrance face positioned on a first end and an exit face positioned on a second end opposite to and parallel to the entrance face and having an interior that passes the plurality of laser beams of light therethrough and an interior surface that reflects light incident thereon back into the interior of the rod-shaped body;
   covering the entrance face with a first reflective coating having a plurality of holes therein to allow light of the plurality of laser beams to pass therethrough into the interior of the rod-shaped body, said first reflective coating being configured to reflect light incident thereon back into the interior of the rod-shaped body; and
   diverging each of the plurality of laser beams toward said exit face through said interior,
   wherein part of the light of said laser beams entering said rod-shaped body via the plurality of holes is forced to pass through the interior a plurality of times before passing through said exit face and then exiting through said exit face as exit light, and wherein the exit light is homogenized by the color mixing rod integrator.

8. The method of claim 7, further comprising the act of providing a partially reflective coating covering the exit face that reflects a part of the light incident thereon back into the interior of the color mixing rod integrator and allows a remaining part of the light incident thereon to pass therethrough.

9. The method of claim 8, wherein each hole of the plurality of holes has a diameter d that exceeds the diameter of the beams of laser light that pass through the plurality of holes by at least a factor of two.

10. The method of claim 9, wherein said diverging act further comprises the act of providing a plurality of optical elements positioned at the plurality of holes such that divergence of a beam at end of a first pass through the color mixing rod integrator is a divergence selected from the group consisting of a spot across entirety of the exit face and a spot of a predetermined diameter on the exit face.

11. The method of claim 10, further comprising the acts of:
   focusing each of said beams of light to enter a hole of said plurality of holes with a half angle $\theta_{1/2} < 20$ degrees in air;
   sizing each said hole of said plurality of holes to have a diameter $\geq 2d$ where d is determined by the equation $$d = 1.22 \frac{\lambda}{2\tan(\theta_{1/2})};$$

to minimize diffraction effects; and
   dimensioning said second reflective coating to have a transmission coefficient $T_e$ that is substantially lower than 50% and a reflection coefficient $R_e = 1 - T_e$ such that part of the light is transmitted and part is reflected back into the interior of the color mixing rod integrator thereby, wherein the reflected light travels back to the entrance face for being substantially reflected for another pass through the color mixing rod integrator with a net effect that light exiting the color mixing rod integrator at the exit face is composed of light that has passed through the color mixing rod integrator at least twice.

12. The method of claim 11, wherein said half angle $\theta_{1/2} < 15$ degrees in air.

13. A projection engine comprising:
a color mixing rod integrator including:
   a rod-shaped body having an interior that passes a plurality of beams of laser light of a plurality of primary display colors therethrough and an interior surface that reflects light incident thereon back into the interior of the rod-shaped body),
   an entrance face positioned on a first end of the rod-shaped body covered with a first reflective coating having a plurality of holes therein to allow the plurality of beams of light to pass therethrough into the interior of the rod-shaped body, said first reflective coating to reflect light incident thereon back into the interior of the rod-shaped body,
   at least one lens for diverging each beam of said plurality of beams toward said exit face through said interior, said at least one lens being positioned in proximity to said plurality of holes, and
   an exit face positioned on a second end of the rod-shaped body opposite to and parallel to the entrance face,
wherein part of the beams of laser light entering said color mixing rod integrator via said plurality of holes at a given half angle is forced to pass through the interior several times before passing through said exit face and then exiting through said exit face as exit light, and wherein the exit light is homogenized by the color mixing rod integrator,
a display panel configured in proximity to said exit face of said color mixing rod integrator such that illumination of said display panel is by the homogenized light exiting through said exit face.

14. The engine of claim 13, further comprising a second reflective coating that is a partially reflective coating, covering the exit face
   wherein a part of the plurality of beams of laser light is reflected back toward sources of the plurality of beams of laser light by the partially reflective coating and a remaining part of the plurality of beams of laser light exits through the exit face.

15. The projection engine of claim 14, wherein said at least one lens includes at least one positive lens positioned at said plurality of holes such that the divergence of a beam at end of a first pass through the color mixing rod integrator is a divergence selected from the group consisting of across entirety of the exit face and a spot of a predetermined diameter on the exit face.

16. The projection engine of claim 15, wherein said first reflective coating on said entrance face is a reflective coating.

17. The projection engine of claim 16, wherein: the reflective coating is a material selected from the group consisting of silver and a dielectric stack;
   the plurality of holes each has a diameter such that each of the plurality of beams of laser light can be focused into one of said plurality of holes and can pass therethrough.

18. The projection engine of claim 17, wherein:
   each said beam of laser light is focused to enter one of said plurality of holes with a half angle $\theta_{1/2} < 20$ degrees in air;
   each of said plurality of holes has a diameter $\leq 2d$ where d is determined by the equation $$d = 1.22 \frac{\lambda}{2\tan(\theta_{1/2})};$$

to minimize diffraction effects; and
   said second reflective coating is dimensioned to have a transmission coefficient $T_e$ that is lower than 50% and a reflection coefficient $R_e = 1 - T_e$ such that part of the light is transmitted and part is reflected back into the color mixing rod integrator thereby,
wherein the reflected light travels back to the entrance face and is reflected for another pass through the color mixing rod integrator having a net effect that light exiting the color mixing rod integrator at the exit face is composed of light that has passed through the color mixing rod integrator at least twice.

19. The projection engine of claim 18, wherein said half angle $\theta_{1/2} < 15$ degrees in air.

20. The projection engine of claim 18, further comprising a relay optics in proximity to said exit face configured to accomplish illumination of said display panel.

* * * * *